United States Patent [19]

Ruhle

[11] Patent Number: 4,463,333

[45] Date of Patent: Jul. 31, 1984

[54] TRANSFORMER-TYPE POSITION TRANSDUCER

[75] Inventor: Frank S. Ruhle, Park Ridge, N.J.

[73] Assignee: Farrand Industries, Inc., Valhalla, N.Y.

[21] Appl. No.: 427,575

[22] Filed: Sep. 29, 1982

[51] Int. Cl.³ .............................................. H01F 21/04
[52] U.S. Cl. ..................................... 336/115; 336/123
[58] Field of Search ............... 336/115, 120, 122, 123, 336/116

[56] References Cited

U.S. PATENT DOCUMENTS

| | | | |
|---|---|---|---|
| 2,799,835 | 7/1957 | Tripp et al. | 336/123 |
| 2,867,783 | 1/1959 | Childs | 336/123 |
| 3,148,347 | 9/1964 | Morrison | 336/123 |
| 3,264,588 | 8/1966 | Winget | 336/123 X |

FOREIGN PATENT DOCUMENTS

216025 5/1958 Australia ............................. 336/123

Primary Examiner—G. P. Tolin
Assistant Examiner—Susan Steward
Attorney, Agent, or Firm—Handal & Morofsky

[57] ABSTRACT

A position-measuring transformer having a pair of confronting relatively movable supports (12, 14) upon the confronting faces (16, 18) of which lie patterns of conductors is disclosed (26, 50). The conductors (26, 50) on the respective supports (12, 14) are dimensioned, configured, and positioned in such a way that portions of the conductors of one support confront portions of the conductors of the other support. When the conductors of one support are energized, a coupling effect is produced in the conductors of the other support. This coupling effect varies as a function of the relative position of the conductors, i.e., the relative position of the support. The energized conductors comprise a pattern of strip-like conductors (30, 88, 116) placed side by side. The conductors in which the coupling effect is produced are of two configurations. The "fine data" pattern comprises strip-like conductors (116) placed side by side in a pattern similar to that of the energized conductors (30). The resultant coupling effect varies substantially sinusoidally and provides a "fine" measurement of the relative position of the coupled strip-like conductors. The "coarse data" pattern comprises conductors (88) which confront the energized conductors (30) along a portion (128) of the energized conductors, the length of this portion (128) varying monotonically as a function of the relative position of the supports. The outputs of the "fine data" and "coarse data" conductors are combined to provide a highly precise measurement of the relative position of the supports (12, 14).

14 Claims, 7 Drawing Figures

TRANSFORMER-TYPE POSITION TRANSDUCER

BACKGROUND OF THE INVENTION

The present invention is an improved position-measuring transformer of the type comprising precision scale elements used for extremely accurate measurement of linear or angular displacements. The noncontacting, inductively or capacitively coupled elements can be directly attached to fixed and moveable members of machine tools, navigational systems, fine control systems, and other precision mechanisms. Electrical output signals can drive readout displays, generate computer input data, and provide servo feedback signals.

The elements of a linear transformer are precision printed circuit patterns with parallel hairpin turns (windings), i.e., series-connected hairpin like conductors arranged in alternate north and south poles, repeated along the adjacent faces of two parallel flat bars. In the case of a rotary configuration transformer, these elements comprise series-connected radially disposed hairpin conductors arranged on the adjacent faces of two coaxially supported disks. These elements comprise primary and secondary windings. In these known air-core devices the spacing of the conductors is the same on both elements, and when the series-connected conductors of the primary winding are energized with an alternating current, the current in the conductor of that winding induces a current in the conductor of the secondary winding which is adjacent thereto. These voltages at the various windings add together to give a secondary voltage which varies in magnitude according to the relative position of the conductors of facing primary and seconary windings. The induced (secondary) voltage is at a maximum when the poles of the conductors face each other. As one element (the rotor) moves, the induced voltage passes through zero and then rises to a negative maximum upon the next incidence of poles confronting each other. Thus, the secondary voltage induced by the primary current is a function of the relative position of the transformer elements. This function is termed the coupling wave.

In general, the induced output voltage will not be a pure sine or cosine function, but it will be a periodic function with a period equal to double the input conductor or pole spacing. It may be considered to be the sum of a sine (or cosine) curve plus a series of harmonics.

Two-phase operation is achieved by providing two independent windings on the transformer stator with 90° phase difference (with respect to each other) in space phase (not time phase). One set of windings is displaced in one-quarter space cycle from the other; the windings on the stator are arranged in groups to permit this displacement. The resulting coupling waves provide paired voltage values which are unique for each position within a full space cycle.

The principle of the linear position-measuring transformer is exactly the same as that of the rotary transformer, linear distances being equivalent to angles. The stator of the linear transformer is known as the slider, and the rotor as the scale. Either slider or scale may comprise the moving element, the other being stationary.

In the rotary transformer, the induced signals are averaged over the entire circular pattern, in the linear transformer, the signals are averaged over a distance corresponding to a substantail number of cycles usually 32 or 48 cycles, but not restricted to any particular number of cycles.

In the rotary transformer according to the prior art, there may be one or more primary windings and one or more secondary windings, all primary windings (if plural) being fixed with respect to each other and all secondary windings (if plural) being fixed with respect to each other, and all primary windings being movable as a unit with respect to all secondary windings. Either winding or group of windings so fixed with respect to all other windings may serve as the primary or as the secondary winding or windings of the transformer, and the terms "rotor" and "stator", if desired, may be interchangeably applied to either of such groups of relatively fixed windings and to the support therefor. Hereinafter the term "member" will be applied to any one of such groups of windings of a transformer, together with the support or supports therefor. Conveniently, however, the member including a continuous winding may be referred to as the rotor or primary member of the transformer.

A transformer useful in measuring the relative angular position of two shafts may be produced by combining two members, for example, a rotor and a stator, confronting each other.

A typical rotor according to the prior art carries a single multipolar winding extending over 360° of a circle. A disk of any suitale material upon which a conductive pattern is produced usually by photoetching a copper layer bonded to a disk material with an insulating adhesive layer, which is preferably substantially planar, carries a single multipolar winding. The winding includes a multiplicity of radially extending strip-like conductors connected in series by circumferential conductors in series by circumferential conductors so that alternate conductors carry current in the same direction, whereas adjacent conductors carry current in radially opposite directions. The conductors are identical in shape and are spaced at uniform angular intervals in a circular arcuate array about the center of a pattern which they establish, the center becoming the effective center of the disk. These conductors cover in uniform fashion the 360° of angle about the disk center.

In the case of both the stator and the rotor, there is one pole per radial conductor, each such conductor forming a pole, and the pole spacing, for example, being about 1°. Transformers according to the prior art are not restricted to any particular number of conductor groups or poles. The number must be even, however, in order that, for a given polarity of energizing voltage applied to the winding, the sense of the magentic fields appearing adjacent the disk face in front of the individual radial conductors will alternate all the way around the disk, and in particular in the two adjacent conductors at which the winding terminates.

The conductors are laid down in the form of a metallic pattern, for example, one made of copper, by a photoetching process, and must be positioned with a relatively high degree of accuracy, although the large number of conductors provided effects an averaging process in the overall coupling between the two transformer members whereby the effect of deviations of individual conductors from their proper positions is decreased or reduced. Transformer members according to the prior art have inner and outer radii for the conductor patterns of the order of $\frac{1}{2}$ and $1\frac{1}{2}$ inches, respectively, although such transformers are not limited by any particular dimensions.

Assuming transformer members each having N poles corresponding to N radial conductors, there will be N relative angular positions of the two members in which each conductor of one member is parallel to and at a minimum separation from one conductor of the other member. N/2 of these positions represent positions of maximum coupling of one sign between the transformer members, whereas the other N/2 positions represent positions of maximum coupling of the opposite sign. The coupling wave goes through N/2 cycles for one relative revolution of the two transformer members. The coupling function or coupling wave of the complete transformer is the sum of the contributions of each of the series-connected secondary winding conductors.

According to the prior art, the conductors are dimensioned to minimize harmonic components in the coupling wave between members having uniformly and equally spaced conductors. The preferred spacing and width of the conductors is discussed in the prior art. Reference is made to U.S. Pat. No. 2,799,835 of Tripp et al.

According to another feature of the prior art, the coupling due to current flow in the circumferential conductors is suppressed by dividing the winding of one of the transformer members (e.g., the stator) into a plurality of sectors so that in one or more sectors of that member the circumferential flow of current is clockwise, while in one or more other sectors the circumferential flow of currrent is counterclockwise, the sectors of clockwise flow subtending at the disk center the same angle as do the sectors in which the circumferential current flow is counterclockwise.

The stator according to the prior art comprises a disk which may be similar to the rotor disk. Laid down on the disk surface are a plurality of conductor groups or sectors, each including a plurality of series-connected radial conductors. Harmonic compensation according to the principles of the above-noted patent may be incorporated into members of this type.

A typical transducer comprises a number of conductor groups, equiangularly spaced from each other. Each group comprises series-connected radial conductors. In use, alternate groups are connected together in series by means of external leads to produce two windings, each of which links one half of the conductor groups or sectors in space quadrature of the pole cycle rotor. The interconnection of the conductor groups or sectors by leads is such that in each of the resulting windings the direction of circumferential current flow is reversed in successive conductor groups of that winding.

Rotary position-measuring transformer may be used in three different ways: (1) in pairs, as angular data transmitter and receiver, in a similar manner to the use of synchros and resolvers; (2) as a device for absolute angular measurement; or (3) for producing an angle in response to a control input.

According to the prior art, a rotary position-measuring transformer may be used as an angular data transmitter, by applying a single-phase AC voltage to the rotor windings. The voltage output from the two-phase stator windings will then be proportional to the sine and cosine of the angular position of the rotor with respect to the stator and this output voltage may be compared to the output voltage from a receiver transformer mechanically coupled to the device whose position is to be controlled.

The receiver transformer has its stator windings excited by the corresponding transmitter stator windings. The output of the receiver rotor is the position error signal, and is zero when the transmitter and receiver are at complementary angular positions. Since there are N nulls per revolution, where N is the number of poles, the transformer is electrically a multiple-speed device. Mechanically, however, it is a one-speed device. To avoid ambiguity, in the prior art it was necessary to use a two-speed servo system, and incorporate another component to give a one-speed electrical signal. The accuracy of this one-speed "coarse" data device need only be sufficiently good to assure that the switchover to "fine" operation with the transformer occurs in the general vicinity of the required null, or within about one-quarter of a transformer cycle. The devices of the prior art have used conventional synchros or resolvers for this purpose, and provision for a one-speed data device is made in the standard rotary transformer assembly. Another method by which "coarse" data has been provided according to the prior has been to provide a separate one-speed transformer pattern on the same set of disks but this method requires larger disks.

The same three basic methods of use which are characteristic of the rotary position-measuring transformer also apply to the linear position-measuring transformer; the only difference between the two devices is that the angle of the rotary form becomes a linear distance in the linear form. For example, the linear transformer may be used in transmitter-receiver applications in the same way as the rotary transformer, to accurately reproduce linear movements at a distant point. Again, a "coarse" control is necessary to avoid ambiguity. The usual method of providing this course control is to use a rotary synchro or resolver operated through a rack and pinion or a lead screw. The accuracy of this coarse data element need be sufficient only to assure that the switchover to "fine" operation with the transformer occurs in the vicinity of the null, or about one-quarter of a transformer cycle, i.e., 0.025 inch along the linear scale.

SUMMARY OF THE INVENTION

The general object of this invention is to provide an advantage over the prior art, according to which "coarse" or "absolute" data is obtained by using a single primary to excite course and fine secondary segments. The present invention comprises improved patterns of the conductor windings applicable to both rotary and linear position-measuring transformers. In the case of a rotary transformer according to the present invention, the transmission of both coarse and fine information is achieved via coupling of an improved rotor pattern and an improved stator pattern. In the case of a linear transformer according to the present invention, the transmission of both coarse and fine information is achieved via coupling of an improved slider pattern and an improved scale pattern.

These improved patterns of the transformer windings eliminate the synchros and resolvers previously required to obtain the course data. This simplifies the position-measuring system and reduces the amount of space occupied by the system. Moreover, this is achieved substantially without affecting the accuracy of the fine data transmitted by the transformer.

These improvements are effected, for example, in the case of a rotary transformer by "ramping" the outer edges of the rotor pattern in relation to the stator pattern such that the amplitude of a secondary set of induced voltages in certain sectors of the stator pattern yields the coarse data. The other sectors of the stator pattern yield the fine data according to the principles of a conventional transformer transducer as described above.

According to a well known geometric relationship, the sum of the squares of the sine and cosines of any particular angle is always equal to 1. In the case of the inventive position measuring transformer, the sum of the squares of the sine and cosine output signals will be on an amplitude which is a constant multiplied by the ramped radial length of that portion of the primary coupled to the secondary. This radial length will vary as a function of coarse angular position. Because of the squaring and summing, sinusoidal variation as poles move from full coupling to full uncoupling to full coupling again is cancelled, leaving only the coarse information. The amplitude of this signal and the angular position will thus be determined by the total coupling between the two members of the transformer.

In particular, the rotor conductors form an eccentric circular pattern, with poles along true radial lines to the center of rotation. The stator pattern would for the most part resemble the conductor pattern of a conventional rotary transformer except that at every 90° a set of sine and cosine sectors with shortened poles are positioned to serve as coarse pick-up sectors: coarse sine minus, coarse cosine plus, coarse sine plus, and coarse cosine minus. The output of these coarse sectors is demodulated and squared. Then the output of the coarse sine minus circuit is subtracted from the coarse sine plus output, and the resulting signal is the coarse sine signal, a similar operation is performed on the coarse cosine plus and minus signals to obtain the coarse cosine signal. These resultant signals form a "d.c." sine-cosine pair. A "d.c." sine-cosine converter is then used to digitize these signals. Alternately the "d.c." sine-cosine signals might be used to modulate an "a.c." carrier signal such that the resultant "a.c." signals may be used in conventional position measuring circuits.

DESCRIPTION OF THE PREFERRED EMBODIMENTS

The inventive position measuring transformer will first be described in terms of its application to the measurement of angular position and with reference to the figures. It is noted that in the case of both rotary and linear position-measuring transformers, the present invention can be effected by capacitively coupled rather than inductively coupled elements.

Figure 1:
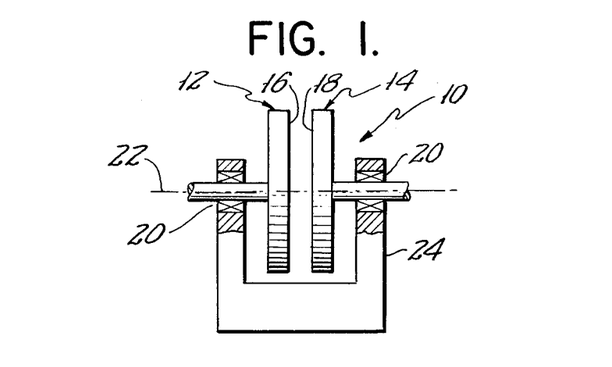
FIG. 1 is a view in side elevation of a rotary transformer according to the present invention.

One form of position transformer 10, constructed according to the invention, for the measurement of angular position is generally illustrated in FIG. 1. Transformer 10 includes a rotor 12 and a stator 14, which are disks made of any suitable material having plane faces 16 and 18, respectively, and mounted in bearings 20 for relative rotation about an axis 22 with respect to which the faces 16 and 18 are perpendicular. Either or both of the rotor and stator may be rotatable with respect to the surrounding frame 24. It is sufficient that the rotor and stator be rotatable with respect to each other. Of course, while the rotor and stator need not be round in shape, the outline of the disks being immaterial, they are advantageously round and centered on the axis 22 of rotation. The rotatably mounted rotor and stator must be restrained against relative axial motion so that the spacing between plane faces 16 and 18 will remain constant within reasonably close tolerances. The bearings 20 may be designed according to well-known methods to include thrust elements limiting the endwise play of the disks.

Figure 2:
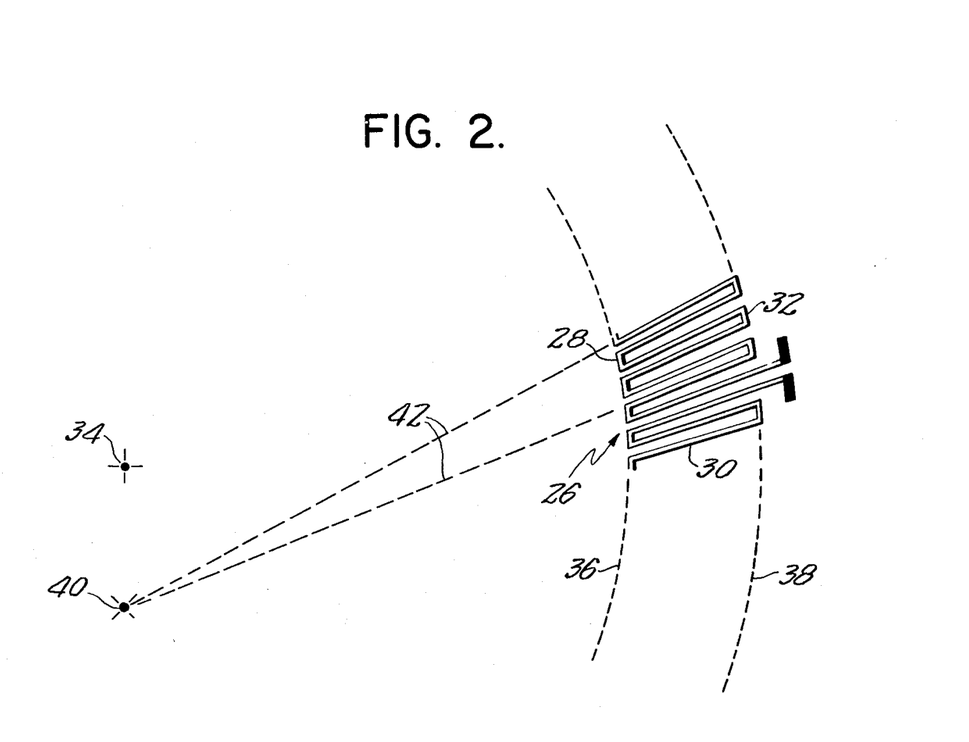
FIG. 2 shows the pattern geometry of the rotor conductors.
Figure 3:
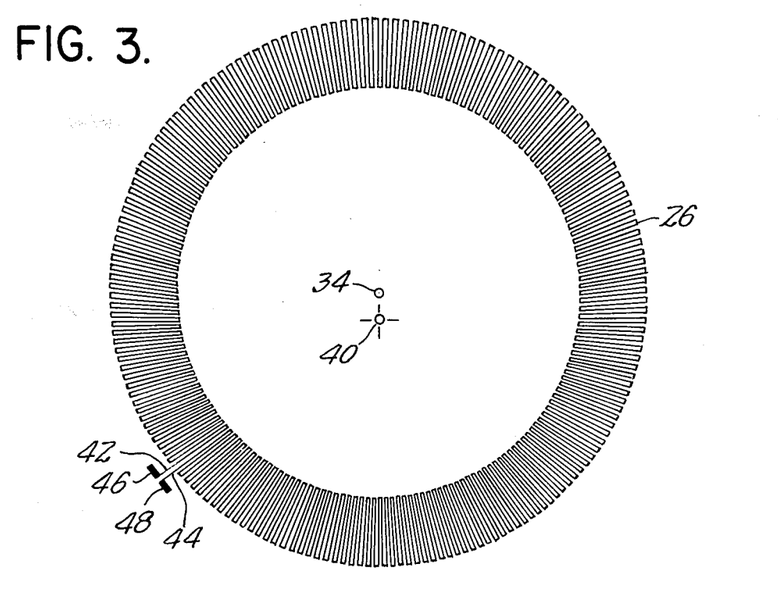
FIG. 3 shows the preferred embodiment for the pattern of the rotor conductors according to the present invention.
Figure 4:
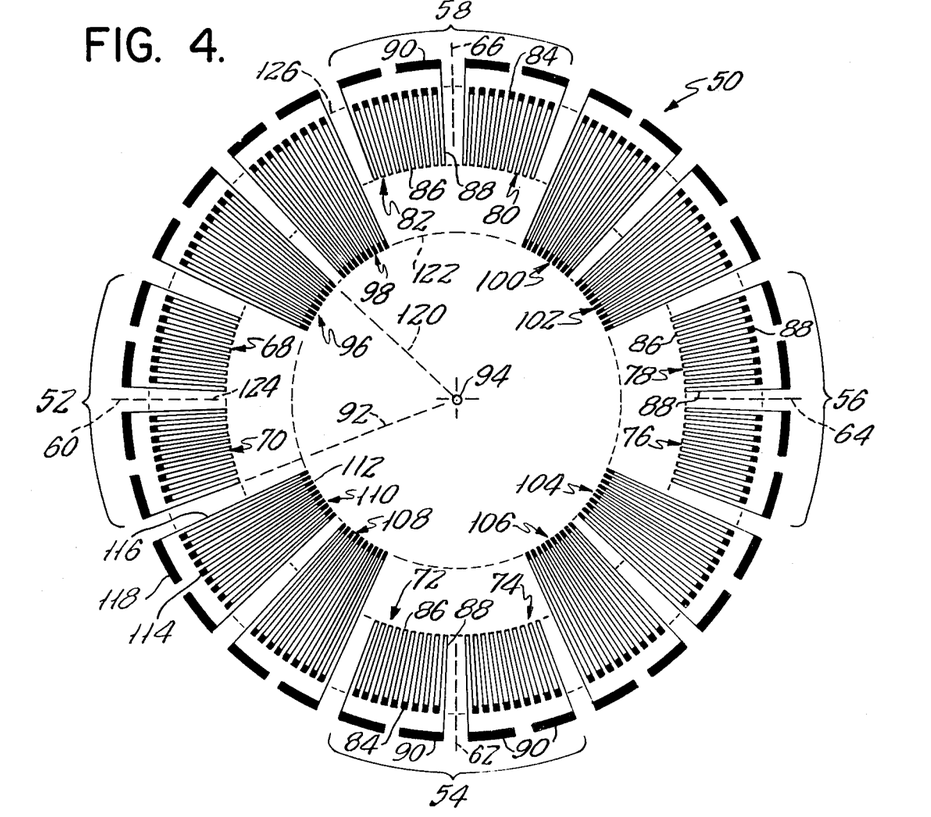
FIG. 4 shows the preferred embodiment for the pattern of the stator conductors according to the present invention.

According to the preferred embodiment for the coarse-fine rotary patterns of the present invention, face 16 bears a winding 26 (of the type shown in partial detail in FIG. 2 and in FIG. 3) and face 18 a winding pattern of the type shown in FIG. 4. An enlarged portion of the rotor winding 26 of FIG. 3 is presented in FIG. 2, showing the geometry of the winding or conductor pattern. Rotor winding 26 comprises series-connected inner circumferential conductors 28, radial conductors (poles) 20, and outer circumferential conductors 32. A plurality of these series-connected conductors are depicted in FIG. 2.

The winding geometric center 34 is equidistant from all points along the inner envelope 36 formed by the inner circumferential conductors 28 of rotor winding 26. Geometric center 34 is also equidistant from all points along the outer envelope 38 formed by the outer circumferential conductors 32. Inner envelope 36 and outer envelope 38 are partially depicted by dashed arcs. Inner and outer circumferential conductors 28 and 32 are disposed along arcs respectively defined by inner and outer envelopes 36 and 38.

The center of rotation 40 of the rotor is displaced from the winding's center of geometry 34. The rotor winding 26 of the present invention is constructed so that the radial lines along which poles 30 lie, lie along rotationally true radial (dashed) lines 42 which extend from the center of rotation 40. Poles 30 form an annular region covering the entire 360° of a circle, as shown in FIG. 3. It should be noted that the rotor winding of the present invention is not limited to a specified number of poles. The poles 30 are substantially equally spaced, the average spacing varying according to the number of poles. Also, poles 30 are approximately equal in length, because inner envelope 36 in FIG. 2 is circular about center 34 and poles 30 are directed along radial lines to the center of rotation 40 displaced from center 34.

Rotor winding 26 terminates at two adjacent poles 42 and 44 conveniently at the radially outer ends thereof. Each of the outer ends are electrically coupled to terminals 46 and 48. Leads are attached to these terminals for supplying a voltage to the rotor winding 26. Rotor winding 26 may also terminate at the radially inner ends of two adjacent poles.

The preferred embodiment of the coarse/fine rotary pattern 50 of the stator conductors according to the present invention is shown in FIG. 4. In this embodiment the stator windings comprise sixteen sectors, each sector subtending an equal angle of arc. Sector pairs 52, 54, 56 and 58, which have their angular centers 60, 62, 64 and 66 at 90° intervals, have shortened poles and function as coarse pick-up sector pairs.

Each of the coarse stator sectors 68, 70, 72, 74, 76, 78, 80 and 82 comprises outer circumferential conductors 84, inner circumferential conductors 86, radial conductors 88 and circumferential terminals 90. All of these conductors are series-connected. Leads are attached to the terminals 90 in accordance with the schematic diagram of FIG. 5 for picking up an induced voltage. Poles 88 of all coarse stator sectors are equal in length. The centerlines of poles 88, lie along true radial lines 92 which intersect the stator center 94.

There are eight fine stator sections 96, 98, 100, 102, 104 106, 108 and 110. Each of the fine stator sectors comprises a plurality of inner circumferential conductors 112, outer circumferential conductors 114 and radial conductors 116, and a pair of terminals 118. Radial conductors or poles 116 lie along the radial lines 120 extending from stator center point 94. All stator sections are symmetrical about center point 94, the inner envelope 122 defined by the inner conductors of the fine stator sectors, the middle envelope 124 defined by the inner circumferential conductors of the coarse stator sectors, and the outer envelope 126 defined by the outer circumferential conductors all defining circles with center point 94 as their center.

As discussed above, position transformers of the type of the present invention work by measuring the magnitude of induced current in the transformer secondary when the primary is fed with an alternating current source. Such coupling is at a maximum when the poles and circumferential conductors of the primary directly overlie the poles of circumferential conductors of the secondary. Coupling is at a minimum when the poles of the primary overlie the spaces between the poles of the secondary. Finally, current is at a negative maximum when the poles of the primary overlie the poles of the secondary and the circumferential conductors of the primary overlie the spaces between the circumferential conductors of the secondary. As the primary is angularly displaced by minute increments at varying positions with respect to the secondary, the induced current in the secondary varies from a minimum value to a maximum value to a minimum value again to a negative maximum value and finally returning to the minimum value after which the cycle is repeated. Such variation is substantially sinusoidal in nature. The magnitude of the induced currents in the secondary is thus a function of the angular position of the primary with respect to the secondary and the length of the poles which perform the coupling function.

Figure 5:
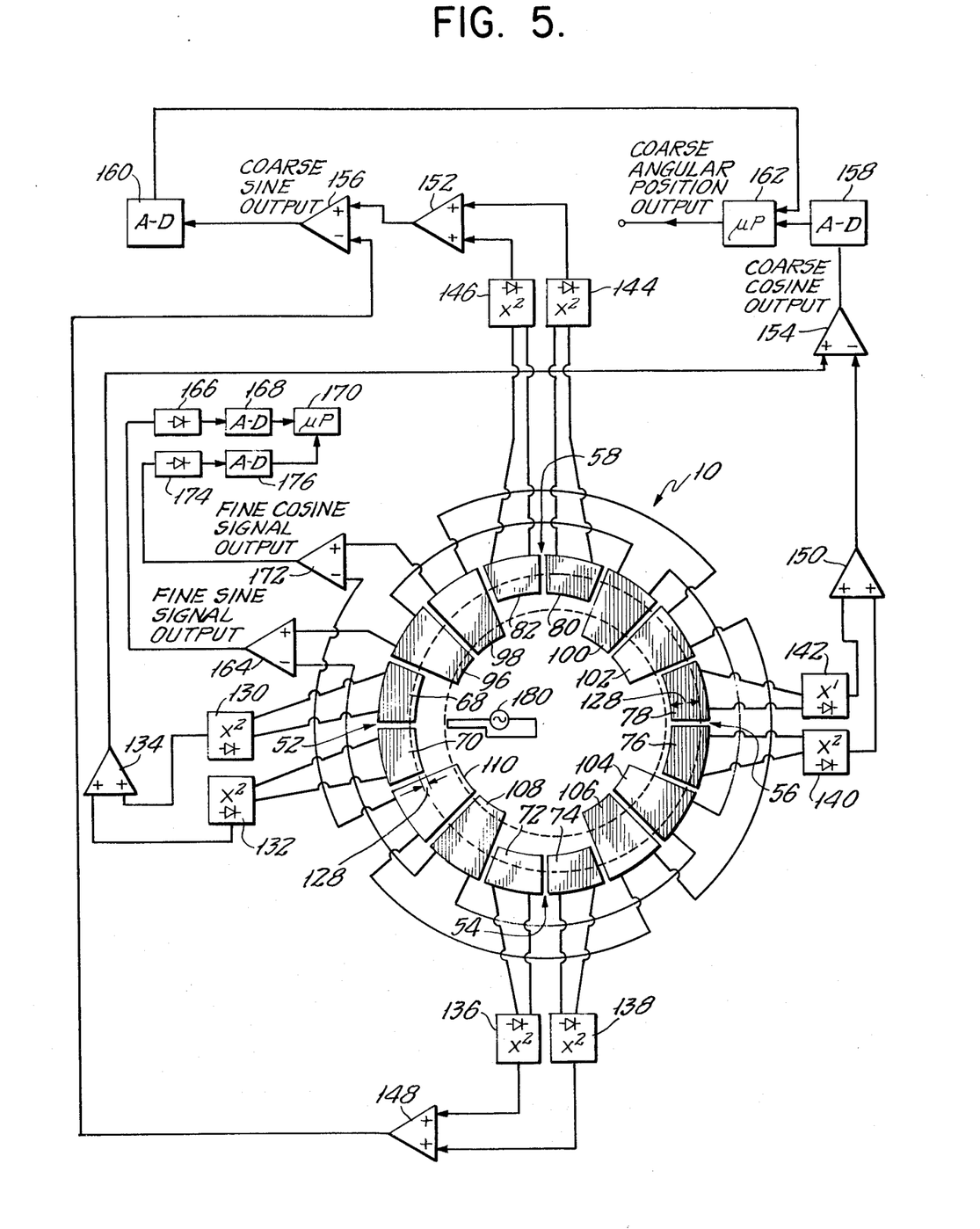
FIG. 5 is a schematic diagram of the rotary system of the present invention.

As can be seen from FIG. 5, the portions 128 of the rotor and stator which overlie each other vary dependent upon angular position of the rotor with respect to the stator. In particular, the overlying portions vary from a minimum value such as that of sectors 68 and 70 to a maximum value such as that of sectors 76 and 78. Dependent upon the angular position of the rotor 12, all of the coarse data sectors will experience various coupling lengths and, accordingly, different induced currents. Because the rotor is comprised of an eccentrically mounted circular pattern coupling with a circular pattern which is symmetrically mounted for rotation with respect to the eccentric, the length of the overlying portion and, accordingly, the coupling between the primary and secondary will also be sinusoidal. Likewise, if we were to measure the average coupling for sectors 68 and 70 and compare it by way of substraction to the average coupling for sectors 76 and 78, this differential signal will also vary sinusoidally. Likewise, if we derived the differential for the coupling of sectors 72 and 74 with respect to sectors 80 and 82, this second differential signal would also be sinusoidal in variation. However, there would be a 90° phase difference between the two differential signals. Thus, if we were to define the coupling of one of these signals as a sinusoidal variation signal, the second would be defined as a cosinusoidal variation signal. Because the sine and cosine at any given angle create a unique pair which is unique for any angle between 0 degrees to 360 degrees, these two "coarse" signals could be used to uniquely determine the angular position of the rotor with respect to the stator and, accordingly, the course angular position of the object coupled to the transformer whose angular position one desires to measure.

The problem which remains to be solved is to ignore the pole-to-pole sinusoidal variations in amplitude in order to obtain the coarse coupling variations (which vary sinusoidally at the rate of 360 degrees for each revolution) which are defined by the magnitudes of overlying portions 128. The solution to the problem lies in the relative placement of respective sectors within each of the sector pairs 52, 54, 56 and 58. In particular, with respect to each of the sector pairs, one of the sectors in the sector pair is placed in an angular position with respect to the other sector of the sector pair in such a manner that when one of the sectors has its poles directly overlying the poles of the rotor, the other sector of the sector pair has its poles overlying the spaces between the poles of the rotor. Thus, if the one sector pair's electrical output is defined as a sine, the sinusoidal variation of the other sector of the pairr will be a cosine function. For clarity sake we could refer to these functions as fine cosine and fine sine functions for the coarse stator sections. These fine sine and cosine functions for the coarse data sections can be used to derive the coupling factor resulting from the size of the overlying portion 128.

In particular, it is known that:

$$\sin^2 + \cos^2 = 1$$

If we consider the signals at the secondary to be a function of a coupling factor K which, in turn, is a function of the length of the overlying portion 128 associated with the respective fine sine-cosine sector pair of the coarse stator sections, we would find on the secondaries of the transformer two signals, namely, K sin $\gamma$ and K cos $\gamma$. If we were then to detect both of these signals through the use of a rectifier and square these signals the following equation would show that the resultant signal would be an analog signal having a value K:

$$K \sin^2 \gamma + K \cos^2 \gamma = K$$

The practical implementation of these concepts is illustrated in FIG. 5. In particular, the outputs of sectors 68 and 70 are sent to detector and squaring circuits 130 and 132, respectively, which provide the required squared sine and cosine signals which, in turn, are added by adder 134. In like fashion, sectors 72 and 74, 76 and 78, and 80 and 82 feed detector and squaring circuits 136, 138, 140, 142, 144, and 146, respectively. These circuits, in turn, drive adders 148, 150 and 152, as illustrated in FIG. 5. Differential amplifier 154 receives the output of adders 134 and 150 to produce a coarse cosine signal. Similarly, differential amplifier 156 receives the output of adders 152 and 148 to provide a coarse sine signal. The coarse sine and cosine signals are converted by analog to digital converters 158 and 160 to digital which, in turn, are fed to a microprocessor 162 which uses the digital sine and cosine signals to calculate the angular position of the position transformer 10 in coarse terms.

Fine angular position data is derived by using the fine stator sections 96, 98, 100, 102, 104, 106, 108 and 110. It is noted that because these fine stator sections are substantially longer than the coarse stator sections, the portion of the primary overlying the secondary is always a constant, namely, the radial length of the rotor transformer pattern.

Because of the fact that both a sine and cosine signal are needed in order to derive fine information, it becomes necessary to define certain of the fine sectors as sine sectors and certain of the fine sectors as cosine sectors. In particular, one may define sectors 96, 100, 104 and 108 as fine sine sectors. These fine sine sectors are connected in series as illustrated in FIG. 5 and the output of this signal fed to an amplifier 164 to amplify the fine sine signal. This fine sine signal is then detected by a detector 166, converted to a digital signal by an analog to digital converter 168 and fed to a microprocessor 170 which receives the thus generated fine sine information.

In turn, fine stator sectors 98, 102, 106 and 110 serve the function of fine cosine signal generators. In order to serve this function they are positioned with an angular position on the stator such that when the fine sine sectors directly overlie the fine pattern on the rotor, the poles of the fine cosine sector directly overlie the spaces between the poles on the stator. The output of sectors 98, 102, 106 and 110 are thus connected in series as illustrated in FIG. 5 to generate a fine cosine signal and their outputs added by amplifier 172 and the output of amplifier 172 sent to detector 174 and from there to analog to digital converter 176. The output of the analog to digital converter sent to microprocessor 170. Microprocessor 170 is fed with fine sine and cosine information and derives fine position information such as, for example, the minutes and seconds in the angular position of the rotor. This information added to the coarse information derived by microprocessor 162, for example, the degrees in the angular position of the rotor, gives a complete reading on the angular position of the rotor. Transformer 10 may be driven using any suitable source, such as a 0.10 Kilohertz source 180.

The principles of the present invention can be applied with equal effectiveness to a linear transformer. In addition, the members of the transformer (rotary or linear) may be capacitively coupled rather than inductively coupled. A preferred embodiment of a capacitively coupled linear transformer is shown in FIGS. 6 and 7.

Figure 6:
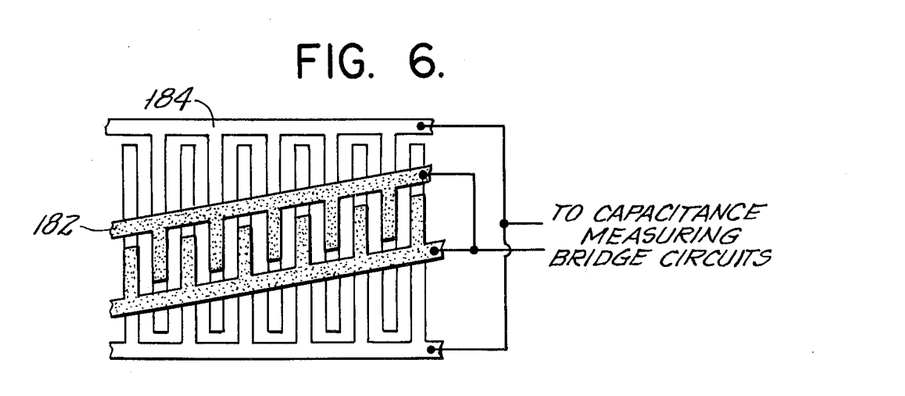
FIG. 6 shows a view of top elevation of an alternative embodiment of the coarse-fine transformer of the invention which is capactively coupled, multipolar linear transformer according to the present invention with the conductors of the members of the linear transformer shown in detail.
Figure 7:
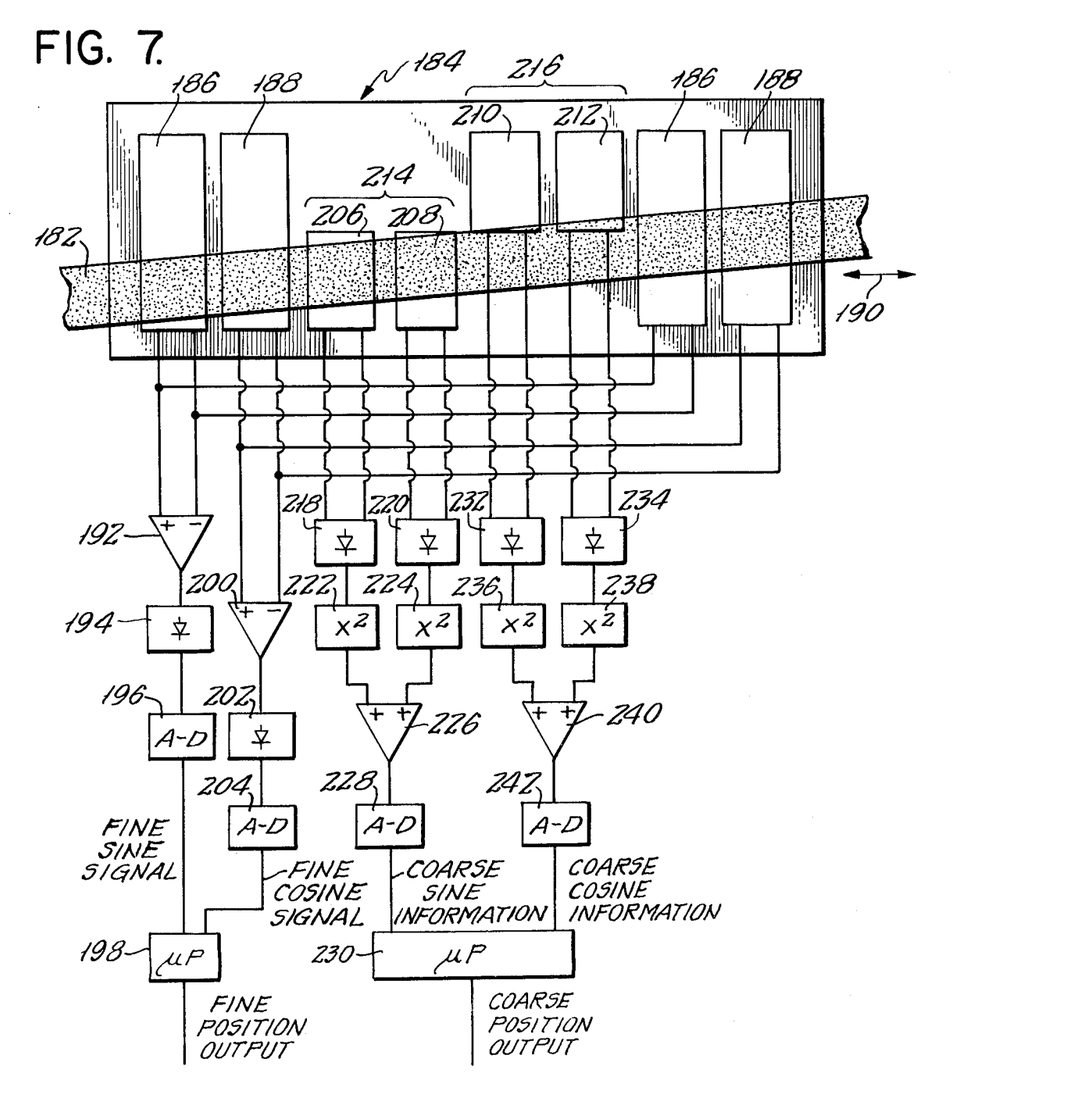
FIG. 7 is a schematic diagram of a system using the transformer of FIG. 6.

The conductors of the members of a capacitive linear position measuring transducer are partially illustrated in FIG. 6. For the purposes of demonstration the translational member 184 will be termed the slider and the stationary member 182 the scale. The conductors of slider 184 comprise fine sine sectors 186, and fine cosine sectors 188.

As the slider 184 moves with respect to the scale 182 in the direction indicated by arrow 190, the variation in the voltage capacitively coupled between slider and scale is sinusoidal in much the same manner as the corresponding parts in the rotary transformer described above.

As the slider 184 moves with respect to the scale 182 in the direction indicated by arrow 190, the variation in the voltage capacitively coupled between slider and scale is sinusoidal in much the same manner as the corresponding parts in the rotary transformer described above.

The voltages coupled into the secondary windings are fed into circuitry which is substantially similar to that described in the rotary transformer embodiment. The fine sine sections 186 are connected in parallel as illustrated in FIG. 7 and the output signal of these sections is fed to an amplifier 192 to amplify the fine sine signal. This fine sine signal is then detected by a detector 194, converted to a digital signal by an analog to digital converter 196 and fed to a microprocessor 198 which receives the thus generated fine sine information.

In turn, fine cosine slider sections 188 are connected in parallel and the output signal of these sections is fed to an amplifier 200. The amplified signal is detected by detector 202 and fed to an analog to digital converter 204 which converts the signal to digital fine cosine information which is fed to microprocessor 198. The microprocessor operates on the fine sine and cosine information to provide the fine position output which, for example, would be in thousandths of an inch.

Also, in a manner similar to the above-described rotary embodiment, coarse sine section pair 214 consists of shortened fine sine section 206 and shortened fine cosine section 208 which have their outputs fed to detectors 218 and 220 whose outputs are in turn fed to squaring circuits 222 and 224. The outputs of the squaring circuits are fed to adder 226 whose output is, in turn, fed to an analog to digital converter 228, which outputs a digital coarse sine signal to a microprocessor 230.

In a similar manner, the outputs of the coarse cosine section pair 216 which consists of shortened fine sine and cosine sections 210 and 212 are fed into circuitry consisting of detectors 232 and 234, squaring circuits 236 and 238, adder 240 and analog to digital converter 242. The digital coarse cosine information is fed into microprocessor 230. The output of the microprocessor 230 is the coarse position output which for example would be in inches. The outputs of microprocessors 198 and 230 when considered together provide accurate absolute linear position information.

While, an illustrative embodiment of the invention has been disclosed, it is, of coarse, understood that various modifications will be obvious to those of ordinary skill in the art. Such modifications, such as different decoding circuitry and the like, are within the spirit and scope of the invention which is limited and defined only by the appended claims.

I claim:
1. A position measuring device, comprising:
(a) first support means;
(b) second support means;

(c) mounting means for movably supporting said first support means in facing relationship to said second support means;

(d) a first multiplicity of elongated conductive poles having a first length electrically coupled to each other, and disposed side by side on said first support means, said poles being configured, positioned and dimensioned to move in a nonsymmetrical fashion with respect to said second support means, when said first support means is moved with respect to said second support means;

(e) a second multiplicity of elongated conductive poles having a second length, electrically coupled to each other, and coupled to said first multiplicity of poles, said second multiplicity being disposed side by side on said second support means, said poles being configured, positioned and dimensioned to coincide lengthwise with the entire length of facing poles of said first multiplicity, regardless of the position at which said second support means is supported with respect to said first support means by said mounting means;

(f) a third multiplicity of elongated conductive poles having a third length, electrically coupled to each other, and coupled to said first multiplicity of poles, said third multiplicity being disposed side by side on said second support means, said poles being configured, dimensioned and positioned to coincide with a variable portion of the length of facing poles of said first multiplicity, the magnitude of said variable portion varying with the position at which said second support means is supported with respect to said first support means;

(g) means for measuring the electrical characteristics of said first multiplicity with respect to said second multiplicity to derive fine position information; and (h) means for measuring the electrical characteristics of said first multiplicity with respect to said third multiplicity to derive coarse position information.

2. A position measuring device as in claim 1, wherein said third multiplicity comprises a first group of poles and a second group of poles, said first group being positioned, configured and dimensioned with respect to said second group in such a manner that when poles in said first group directly overlie poles of said first multiplicity, poles of said second group overlie the spaces between poles of said first multiplicity.

3. A position measuring device as in claim 2, wherein said elongated conductive poles are radially disposed and said mounting means rotatably supports said first support means with respect to said second support means.

4. A position measuring device as in claim 3, further comprising a fourth multiplicity of elongated conductive poles having said third length, electrically coupled to each other, and coupled to said first multiplicity of poles, said third multiplicity being disposed side by side on said second support means, said poles being configured, dimensioned and positioned to overlie a variable portion of a length of said facing poles of said first multiplicity, the magnitude of said variable portion varying with the position at which said second support means is supported with respect to said first support means, said second support means being mounted with respect to said first support means in such a manner that said first multiplicity defines a circumferential shape which is eccentrically positioned for rotation with respect to said third multiplicity.

5. A position measuring device as in claim 4, wherein said second length is substantially larger than said first length whereby eccentric movement of said first multiplicity results in the coupling length between said first multiplicity and said second multiplicity being constant, and wherein all of said poles are disposed along lines radiating from the center of rotation of said first support means with respect to said second support means.

6. A position measuring device as in claim 2, wherein said second multiplicity comprises a third group of poles and a fourth group of poles, said third group of poles being positioned, configured and dimensioned with respect to said fourth group in such a manner that when poles in said third group directly overlies poles of said first multiplicity, poles of said fourth group overlies the spaces between poles of said first multiplicity.

7. A system for measuring position, as in claim 6, further comprising means for detecting and squaring the output of said first group to obtain a first squared signal, means for detecting and squaring the output of said second group to obtain a second squared signal, and adder means for adding said first squared signal to said second squared signal to obtain a coarse positional signal.

8. A system as in claim 7, further comprising data processing means for comparing the signal associated with said third group to the signal associated with said fourth group to obtain fine positional information.

9. A device as in claim 1, 2, 3, 4, 5, 6, 7, or 8, wherein the poles in said first multiplicity are connected in series to serve as a transformer primary and excited by an AC source, the poles in said secoond multiplicity are connected in series to serve as a transformer secondary, and the poles in said third multiplicity are connected in series to serve as a transformer secondary.

10. A device as in claim 1, 2, 3, 4, 5, 6, 7, or 8, wherein the poles of said first multiplicity are connected together, the poles of said second multiplicity are connected to each other, and the poles of said third multiplicity are connected to each other, whereby a portion of said first multiplicity and said second multiplicity act as a first capacitor and a portion of said first multiplicity and said third multiplicity act as a second capacitor.

11. A transformer according to claim 2 wherein the relative movement of said first and second support means is translatory along an axis of translation.

12. A transformer according to claim 3 wherein said first multiplicity of poles is series-connected by inner circumferential conductors lying along an inner envelope, said inner envelope defining a circle with center displaced from said axis of rotation, and by outer circumferential conductors lying along an outer envelope, said outer envelope defining a substantially circular contour circumscribing said inner envelope, and the poles of said first multiplicity lying along lines radial from and perpendicular to the axis of rotation.

13. A transformer according to claim 12 wherein each of the poles of said third multiplicity are connected within four complementary groups of poles, each complementary group comprising equal numbers of poles lying along lines radial from and perpendicular to said axis of rotation, said poles being series-connected by inner and outer circumferential conductors, said inner circumferential conductors lying along a first circular envelope and said outer circumferential conductors lying along a second circular envelope, the circles defined by said first and second envelopes being concentric with a common center coincident with said axis of rotation, and each of said complementary groups subtending equal angles, each of said complementary groups being at right angles to each other.

14. A transformer according to claim 12 or 13, wherein the poles comprising said third multiplicity are series-connected by inner and outer circumferential conductors, said inner circumferential conductors lying along a third circular envelope and said outer circumferential conductors lying along said second circular envelope, the radius of said third circular envelope being less than the radius of said second circular envelope, the center of the circle defined by said thrid envelope being coincident with said axis of rotation.

* * * * *